United States Patent [19]

Brown

[11] Patent Number: 4,802,693

[45] Date of Patent: Feb. 7, 1989

[54] DIRECT READER BOOK

[76] Inventor: Robert A. Brown, 3205 Mt. Zion Rd., Upperco, Md. 21155

[21] Appl. No.: 876,478

[22] Filed: Jun. 20, 1986

Related U.S. Application Data

[63] Continuation of Ser. No. 608,093, May 8, 1984, abandoned.

[51] Int. Cl.⁴ ........................ B42D 19/00; G09B 25/00

[52] U.S. Cl. ........................................... 281/7; 281/8; 281/11; 434/426

[58] Field of Search ....................... 281/6, 7, 8, 9, 11.5; 282/4; 40/86 R, 525; 434/84, 88, 426

[56] References Cited

U.S. PATENT DOCUMENTS

| | | | |
|---|---|---|---|
| 875,828 | 1/1908 | Lafoon | 281/7 |
| 1,279,820 | 9/1918 | Brassard | 281/7 |
| 1,559,665 | 11/1925 | Beery et al. | 434/88 |
| 2,306,634 | 10/1942 | McDonald | 281/7 |
| 2,425,197 | 8/1947 | Montague | 434/426 |
| 2,980,444 | 4/1961 | Rodzyner | 281/11 |
| 3,096,101 | 7/1963 | Raddeman | 281/8 |
| 3,302,309 | 2/1967 | Macomber | 281/8 |
| 3,479,985 | 11/1969 | Morley | 281/7 |
| 4,083,136 | 4/1978 | Zelenko | 281/8 |

FOREIGN PATENT DOCUMENTS

| | | | |
|---|---|---|---|
| 694144 | 9/1964 | Canada | 434/426 |
| 179272 | 12/1906 | Fed. Rep. of Germany | 281/7 |
| 2913827 | 10/1980 | Fed. Rep. of Germany | 434/426 |
| 2949405 | 6/1981 | Fed. Rep. of Germany | 281/5 |
| 516073 | 4/1921 | France | 281/7 |
| 777845 | 3/1935 | France | 281/7 |
| 1028930 | 5/1953 | France | 281/5 |
| 803285 | 10/1958 | United Kingdom | 281/11 |
| 1446346 | 10/1976 | United Kingdom | 281/6 |

*Primary Examiner*—Frank T. Yost
*Assistant Examiner*—Paul M. Heyrana, Sr.
*Attorney, Agent, or Firm*—A. W. Breiner

[57] ABSTRACT

A direct reading book having a housing which will contain mounting means for a roll of printed web and a magnifying lens suitably carried above and in a constant predetermined position above the printed web is described. The printing on the print web is caused to move past the magnifying lens to permit the reader to read the printing on the web passing under the lens. The direct reader permits the replacement of a series of books, such as textbooks, with a series of printed webs, relieving the burden of carrying a large number of books.

15 Claims, 3 Drawing Sheets

FIG. 1
FIG. 2
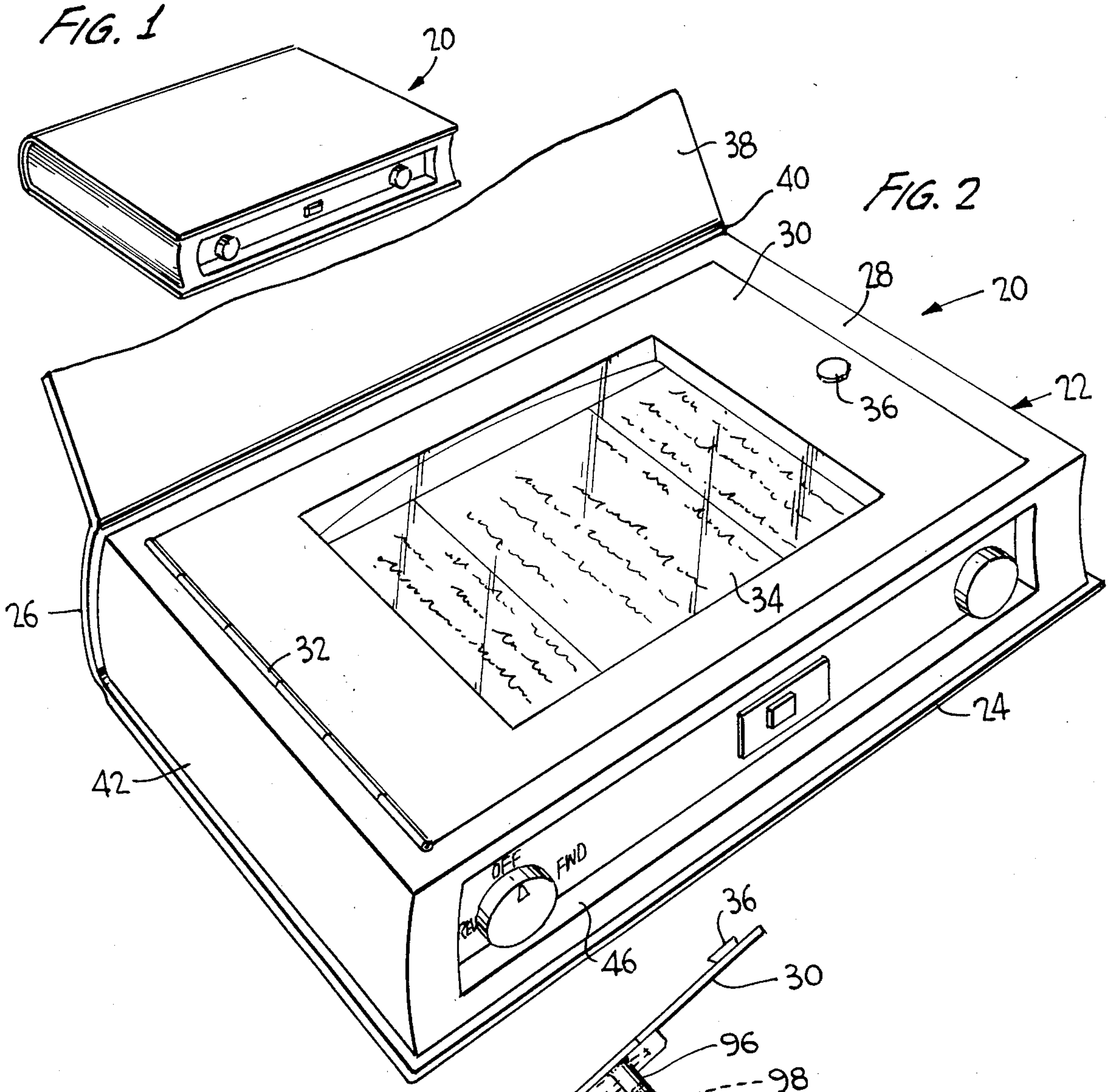
FIG. 5
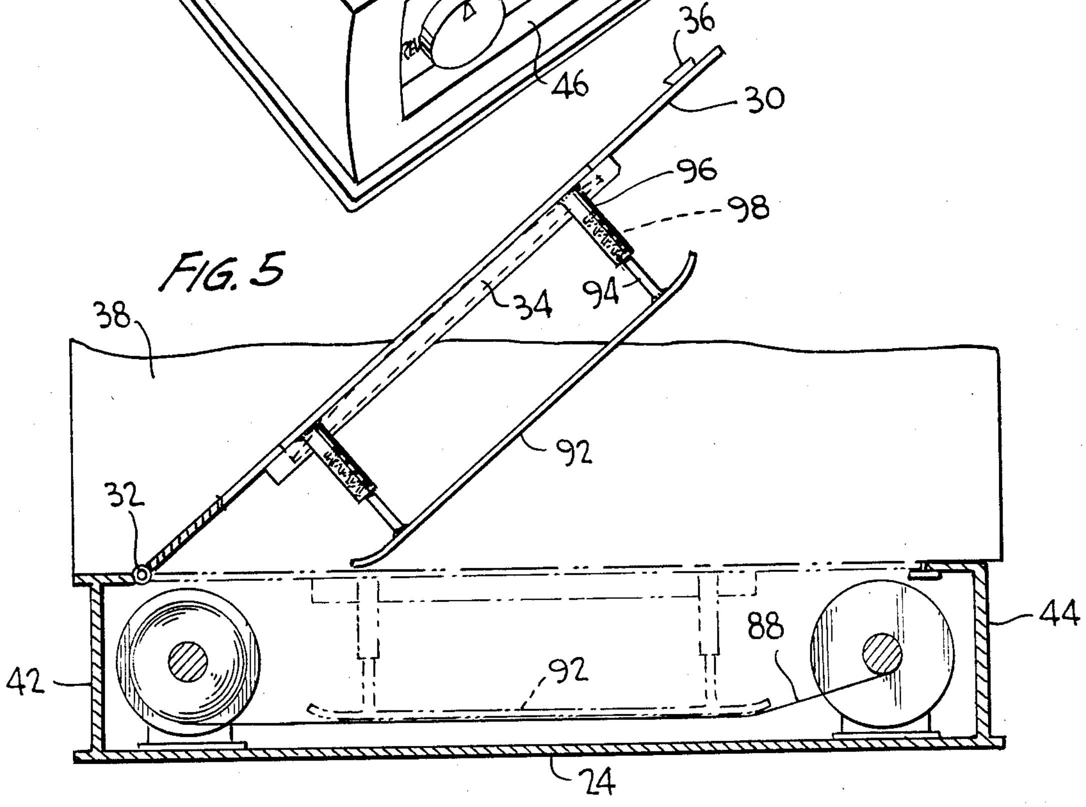

FIG. 8
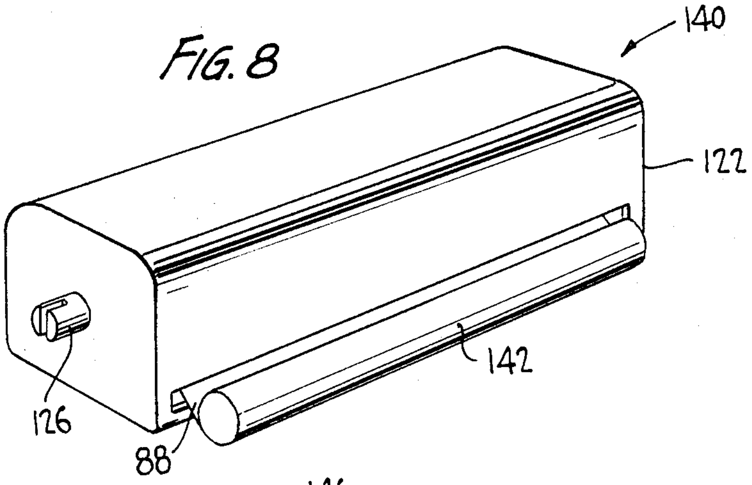
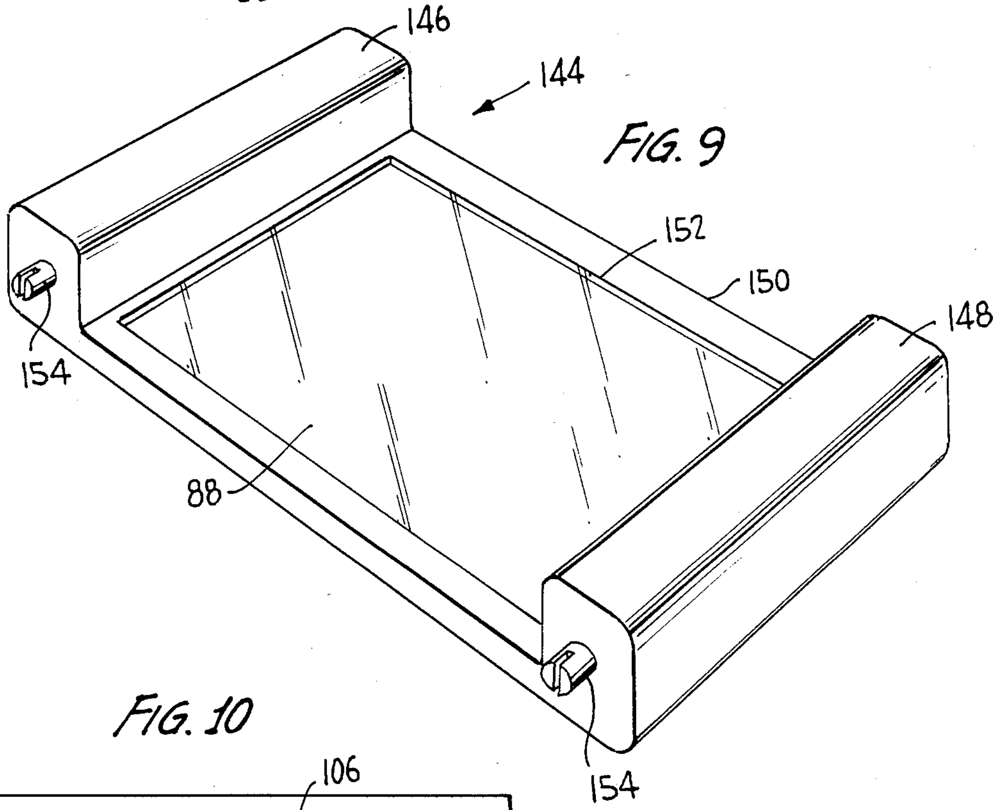
FIG. 9
FIG. 10
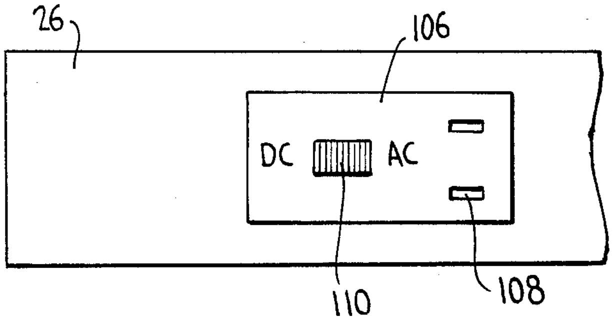

DIRECT READER BOOK

This is a continuation of application Ser. No. 06/608,093 filed May 8, 1984 now abandoned.

This invention relates in general to new and useful improvements in books, and more particularly to a book which, in lieu of printed pages, includes a housing which receives interchangeable webs in roll form.

The book of this invention is particularly adapted for use in textbooks which must be carried by students from class to class, and will be described in reference to that application. It will be apparent, however, that the reader book will have numerous other applications, including in a home library, or a law library, as well as other libraries where storage is a problem. At the present, students must carry large numbers of books with them, with these books being a considerable burden. In accordance with this invention there is provided a housing having the appearance of a book and which housing is provided with means for feeding a web supplied in roll form and having printing thereon. The printing is preferably miniaturized and the book device will have a magnifying lens which will increase the size of the miniature printing to a readily readable size.

In accordance with this invention, it is merely necessary for students to carry with them the necessary rolls of printed webs and to interchange the webs as they go from class to class.

It is envisioned that the size of the permissible web and the printing thereon will be such that at least several chapters of a conventional textbook may be carried by each web.

It is further preferred to provide the webs in the form of cassettes for ready handling.

A principle feature of the invention is the relative simplicity of the device and the fact that due to the miniaturization of the printed text, the webs may be printed at a cost no greater than existing textbook printing.

It is preferred that the web be in the form of an opaque substrate and that reading of the printed matter will be direct through the magnifying lens without the use of any projectors, light sources, or the like.

Other objects and advantages reside in the details of construction and operation as ill more fully hereinafter be described and claimed, reference being had to the accompanying drawing forming a part hereof, wherein like numerals refer to like parts throughout, and in which FIG. 1 is a perspective view of the book formed in accordance with the invention.

FIG. 2 is an enlarged perspective view of the book of FIG. 1 with the cover thereof in an open position and partially broken away and more specifically illustrates the details of the book.

FIG. 5 is a longitudinal sectional view taken generally through the center of the book as shown in FIG. 2 with a front panel thereof hinged to an elevated position to facilitate exchange of the printed webs and shows the provisions of means for positioning the readable part of each web an accurate distance from the magnifying lens.

FIG. 8 is an enlarged perspective view of still another form of cassette.

FIG. 9 is an enlarged perspective view of a further form of cassette.

FIG. 10 is an enlarged fragmentary elevational view of the book showing a connection for ordinary house current.

Figure 3:
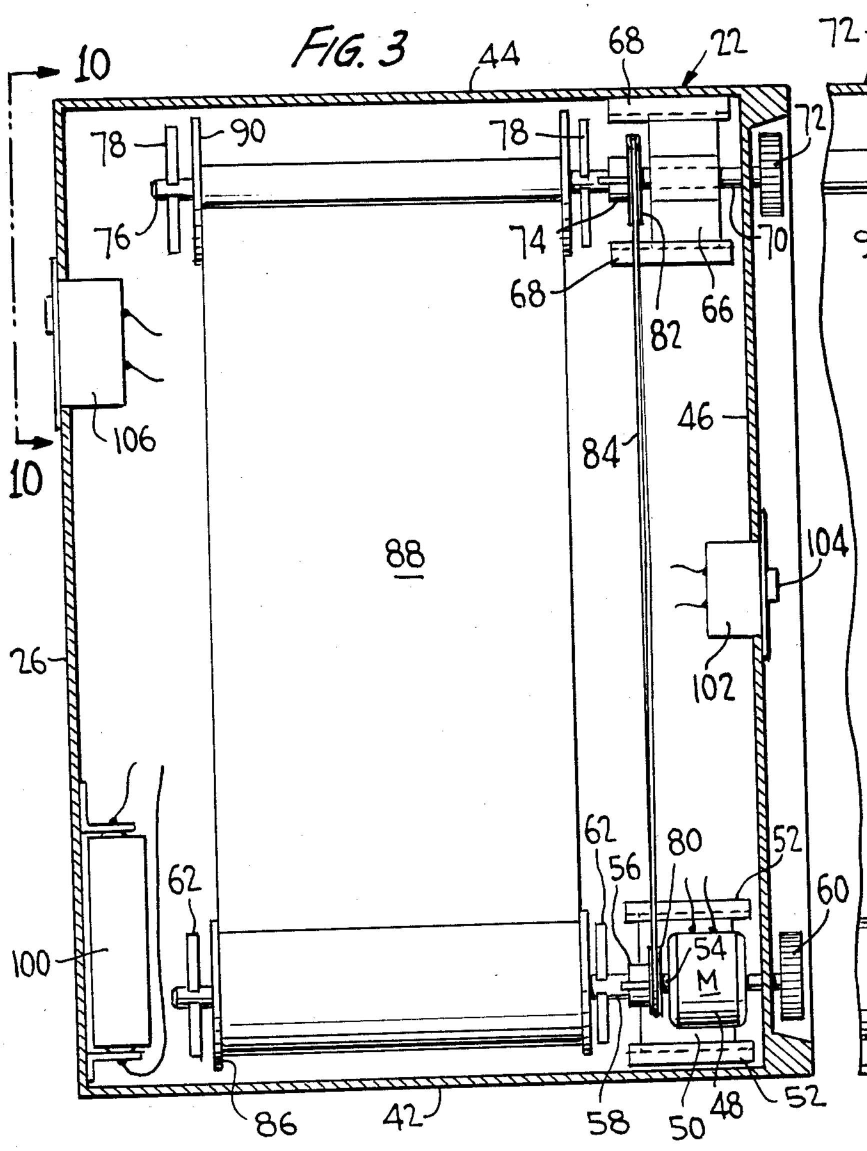
FIG. 3 is a horizontal sectional view taken through the book and shows the details of the internal construction thereof.

Referring now to the drawings in detail, reference is first made to FIGS. 1 and 2 wherein there is illustrated the overall exterior of the book which is the subject of this invention, the book being generally identified by the numeral 20. The book 20 has the general appearance of a conventional book and includes a housing 22 of a configuration to resemble the pages of a conventional book. The housing 22 includes a base 24 in the form of a book recover page. The housing 22 also includes a left side 26 in the form of the backing or binder of a book page. The main portion of the housing 22 is configurated to resemble pages of a book and includes a top panel 28. The top panel 28 is provided with a displaceable panel portion 30 which is hingedly connected to the top panel 28 by way of a hinge 32.

The displaceable panel 30 is provided with an opening in which is positioned a magnifying lens 34. Further, the displaceable panel 30 is provided with a release button or knob 36 which facilitates the lifting of the panel 30.

The book also includes a cover in the form of a book front cover 38 which is connected to the backing 26 by way of a hinge 40 which permits the book to be "opened" or "closed" with the front cover 38 protecting the lens 34 in the "closed" condition of the hook.

It is also to be understood that the portion of the housing 22 which has the appearance of pages of a book will have end walls 42 and 44 and a side wall 46, the side wall 46 being disposed remote from the back 26.

Figure 4:
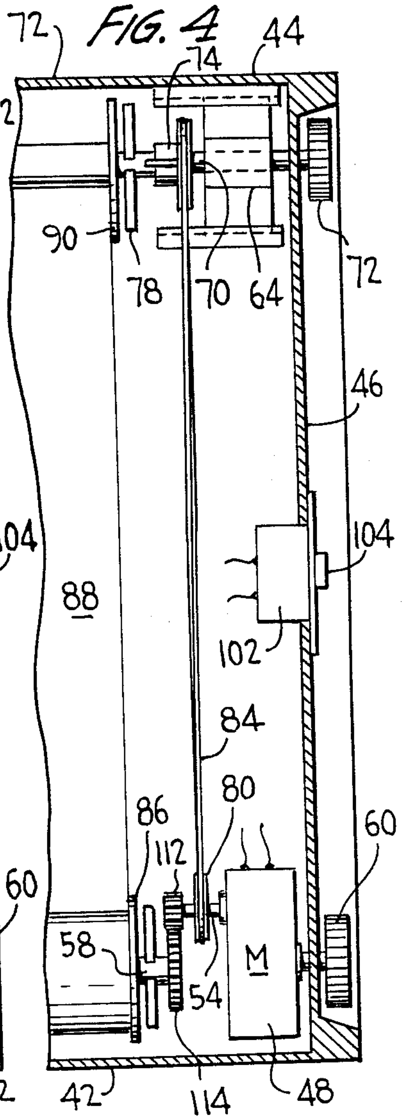
FIG. 4 is a fragmentary horizontal sectional view similar to FIG. 3 and shows a modified type of drive.

With reference to FIGS. 3 and 4, it will be seen that there is mounted within the housing 22 at the corner between the walls 42, 46 a drive motor 48. In the illustrated embodiment of the invention, the motor 48 is mounted on a support 50 which is slideable in a direction parallel to the axis of the motor and slides 52. The motor 48 has a drive shaft 54 which is provided with a sleeve type coupling 56 for engagement over and within a notch in the end of a shaft, such as shaft 58.

The motor 48 is provided with a control knob 60 which, when rotated, will control the direction of rotation of the motor 48 and where moved axially will shift the motor parallel to his axis so as to shift the coupling sleeve 56.

In alignment with the shaft 54 of the motor there is a pair of cradles 62 into which a shaft, such as the shaft 58 may be resiliently snapped with the cradle 62 mounting the shaft 58 for rotation. When the motor 48 is in this left hand position, the coupling sleeve 56 will engage over the end of the shaft 58 and connect the shaft 58 to the motor shaft 54 for rotation therewith.

At the opposite corner of the housing 22 at the intersection between the walls 44, 46, there is mounted a mounting sleeve 64 on a slide plate 66 with the plate 66 having its opposite ends mounted within slides 68. A shaft 70 is rotatably journalled in the mounting sleeve 64 and extends through the wall 46. That end of the shaft 70 which extends through the wall 46 is provided with a knob 72 which may be used either to rotate the shaft 70 or to axially position the shaft.

The opposite end of the shaft 70 is provided with a coupling sleeve 74 of the same type as the coupling sleeve 56. Axially aligned with the shaft 70 is a further shaft 76 which is interlocked with the shaft 70 by means of the coupling sleeve 74 when the mounting sleeve 64 is moved to its left hand position. The shaft 76 is resiliently snapped into and supported by cradles 78 which are identical to the cradles 62.

It will be seen that the coupling sleeves 56, 76 carry drive pulleys 80, 82 which are aligned and which have entrained thereover a drive element 84 which may be in the form of a very small diametered cord. Thus, the shaft 70 is rotated in unison with the motor shaft 54.

In the simplest form of the invention, the shaft 58 will be provided with a spool 86 on which an opaque web 88 is normally stored and which web 88 has printed text thereon with the text being miniaturized. There will be associated with the spool 86 a take-up spool 90.

Referring now to FIG. 5, it will be seen that the panel 30 carries on opposite sides of the magnifying lens 34 elongated shoes 92 which extend in the length direction of the web 88. The shoes 92 may be spring mounted by way of mounting rods 94 which are engaged in mounting the sleeves 96 with the rods 94 being in projecting relation due to the action of springs 98.

When the panel 30 is closed, the shoes 92 engage the web 88 and hold it parallel to the rear cover 24 in spaced relation to the magnifying lens 34 at a preselected distance.

It is to be understood that the motor 48 will normally be powered by a battery 100. The battery 100 will be connected to a control switch 102 having a push button 104. When the button 104 is depressed, the motor 48 will be driven in the direction for which the control knob 60 is set. By selectively coupling the spools 86, 90 to their respective shafts, the spool 86 may initially function as a feed spool and the spool 90 functions as a take up spool. After the desired portion of the text carried by the web 88 has been read, the feed spool 86 may be driven to rewind a web on the spool 86.

It is to be understood that the power source for the motor 48 may either be a battery or a conventional AC supply. Accordingly, the backing or wall 26 may be provided with an adapter unit 106 which, as is best shown in FIG. 10, may include a receptacle 108 for a power cord, and an energy selector switch 110 which may either select AC current from the external power source or DC current from the battery 100.

Referring now to FIG. 4, it will be seen that in lieu of a direct drive between the motor and the shaft 58, there may be a gear drive with the motor shaft 54 carrying a drive gear 112 and the shaft 58 carrying a driven gear 114. Further, there may be additional gears in the gear train. Also, it is to be understood that the gear 114 may be separate from the shaft 58 and carry a coupling sleeve, such as the coupling sleeve 56. Finally, the gear 114 may be mounted for movement axially on the shaft 58 to selectively connect or disconnect the shaft 58 relative to the motor 48.

It is also to be noted that the motor shaft 54 still carries a drive wheel 80.

Figure 6:
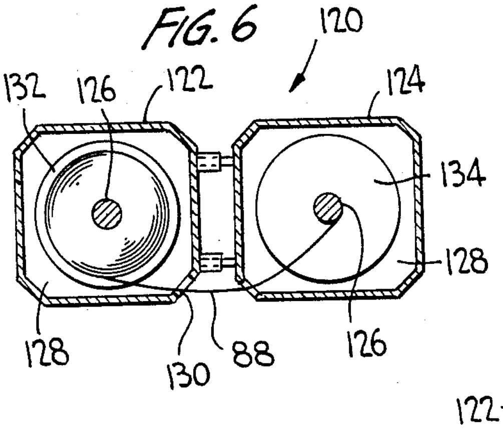
FIG. 6 is a transfer sectional view taken through one form of cassette wherein there are two casings releasably joined together.
Figure 7:
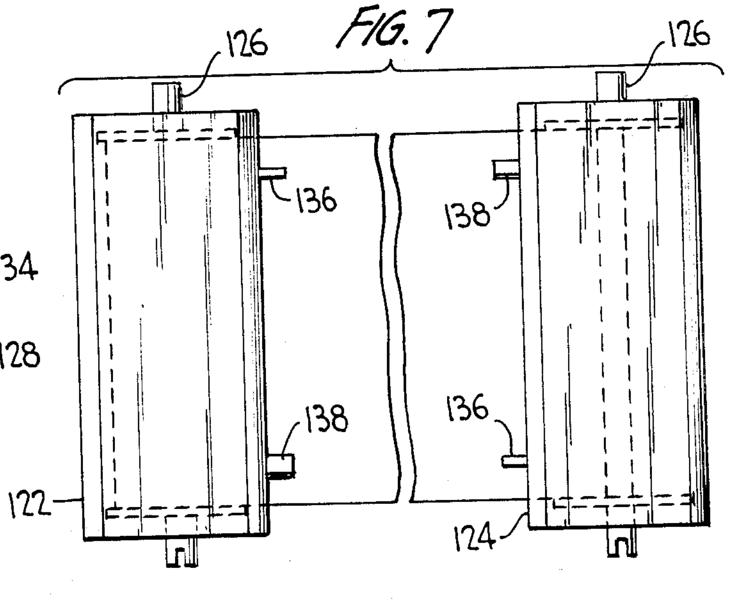
FIG. 7 is a plan view of the cassette of FIG. 6 and shows the two casings in a separated relation ready to be inserted into the book.

Preferably the web 88 is supplied in the form of a cassette. In FIG. 6 there is illustrated a preferred embodiment of a cassette 120 which includes two separate casings 122, 124 disposed in a posed relation. The casings 122, 124 may be identical and each includes a shaft 126 which projects through and is rotatably journalled in end walls 128 of the casings. Each of the casings is provided with a lower slot 130 through which the web 88 carried by a supply spool 132 may pass to a take-up spool 134.

Opposed walls of the cases 122, 124 will be provided with a combination of pins 136 and sleeves 138 for receiving the pins whereby during the storage of the web 88, the casings 122, 124 may be interlocked as shown in FIG. 6. However, these casing may be readily separated for the mounting of the shafts 126 within the cradles 62, 78 in the same manner as the spools 86, 90.

In FIG. 8 there is illustrated a further form of cassette generally identified by the numeral 140. The cassette 140 is in the form of a single one of the casings 122, 124, the casing being identified by the numeral 122. In this construction the web 88 is provided at the feed end thereof with a sleeve 142 which may be readily engaged over a separate shaft (not shown) for winding onto that shaft.

In FIG. 9 there is illustrated still another form of cassette, generally identified by the numeral 144. The cassette 144 includes two casings 146, 148 which are similar to the casings 122, 124 but which are integrally formed therewith an intermediate guide 150. The guide 150 is provided with a central opening 152 and has edge portions which receive and guide the edges of the web 88. The casings 146 are provided with shafts 154 which are similar to the shafts 126.

It is to be understood that when a cassette is utilized, there will be no need for the positioning shoes 92 of FIG. 5.

Although the book 20 is particularly adapted to be read in external light, the same way as any book, it is feasible in accordance with this invention to provide a light (not shown) within the housing 22 for illuminating that portion of the printed text which is in alignment with the magnifying lens 34. Further, it may be desirable to black-out the top and bottom parts of the lens area so as to see and read through the central area only or between two horizontal lines. The blacking out can be accomplished by removably placing a screen over the lens area to permit seeing and reading through the central area only. Alternatively, it may be desirable to have the top and bottom of the lens in a gray color. This will permit seeing through the entire lens area, but favor seeing through the central area. This can serve as a means for improving the reading rate of the reader. As will also be apparent, the size of the print on the printed web can be varied and mated with the strength of the magnifying lens in order that a greater or lesser number of pages can be contained in a suitably sized reel or printed web.

Although only several forms of book constructions and cassettes for the printed webs have been specifically illustrated and described herein, it is to be understood that minor modifications may be made in the book construction and the cassettes without departing from the spirit or scope of the invention as defined by the appended claims. For example, the web can include a sound track along the edge or edges thereof in order that at least a portion of the web produces sound. The sound track will preferably be synchronized with the web speed by use of a variable speed speech control. Webs having sound tracks of this type are known in the art.

It is claimed:

1. A direct reading book comprising a housing having a face wall, a magnifying lens carried by said face wall, means within said housing for mounting in roll form a printed web, a printed web in roll form mounted in said mounting means, said web comprising a book in miniaturized form and said mounting means providing that an intermediate portion of such printed web underlies said magnifying lens, said magnifying lens being designed to re-magnify said book, and positioning means within said housing for maintaining that portion of such printed web in constant preselected spaced relation to said magnifying lens for providing constant magnification of such printed web, said positioning means being a pair of spaced parallel shoes extending downward from the bottom surface of said face wall, and said wall, and said web mounting means includes means for advancing a web.

2. A book according to claim I together with a hingedly mounted cover member for said face wall.

3. A book according to claim 1 wherein said face wall includes a hingedly mounted panel providing access to the interior of said housing, said lens being mounted in said panel and said positioning means extending from the bottom surface of said panel.

4. A book according to claim 1 wherein said web mounting means includes feed and take-up shafts, means for releasably mounting said shafts in said housing for facilitating the mounting and removal of a printed web, and drive means releasably connected to at least said take-up shaft.

5. A hook according to claim 4 wherein said drive means includes drive means for said feed shaft, and means coupling aids drive means for said feed and take-up shaft generally in unison.

6. A book according to claim 1 wherein said printed web in roll form is in the form of a cassette.

7. A book according to claim 6 wherein said cassette includes a casing, said casing having a spool therein, and there being a passage in said casing for a projecting web.

8. A book according to claim 7 wherein said projecting web terminates in a loop.

9. A book according to claim 7 wherein there are two of said casings with said web extending between said casings.

10. A book according to claim 7 wherein there are two of said casings with said web extending between said casings, said casings being separate and having releasable connectors for interconnecting said casings for storage.

11. A book according to claim 7 wherein there are two of said casings with said web extending between said casings, said casing being permanently interconnected in spaced relation by an intermediate web guide, said web guide being said positioning means.

12. A book according to claim 1 wherein said web is paperlike.

13. A book-according to claim 1 wherein said web is opaque.

14. A book according to claim I wherein the web includes a sound track along the edge or edges thereof whereby at least a portion of said web produces sound.

15. A book according to claim 14 wherein the sound track will be synchronized with the web speed by use of a variable speed speech control.

* * * * *